United States Patent
Kosagi et al.

[11] Patent Number: 5,811,759
[45] Date of Patent: Sep. 22, 1998

[54] FIXING DEVICE

[75] Inventors: Yoshifumi Kosagi, Toyokawa; Hideji Hayashi, Okazaki, both of Japan

[73] Assignee: Minolta Co., Ltd., Osaka, Japan

[21] Appl. No.: 707,604

[22] Filed: Sep. 5, 1996

[30] Foreign Application Priority Data

Sep. 26, 1995 [JP] Japan .................................. 7-247078

[51] Int. Cl.$^6$ .................................................. G03G 15/20
[52] U.S. Cl. ........................... 219/216; 399/331; 399/333
[58] Field of Search ........................... 219/216, 469–471; 399/330–334; 432/60; 492/46

[56] References Cited

U.S. PATENT DOCUMENTS

| | | | |
|---|---|---|---|
| 4,001,545 | 1/1977 | Wada et al. | 219/216 |
| 4,813,372 | 3/1989 | Kogure et al. | 219/216 |
| 5,019,692 | 5/1991 | Nbedi et al. | 219/216 |
| 5,420,392 | 5/1995 | Sakata | 219/216 |
| 5,420,395 | 5/1995 | Hyllberg et al. | 219/470 |

FOREIGN PATENT DOCUMENTS

| | | |
|---|---|---|
| 54-88134 | 7/1979 | Japan . |
| 59-28177 | 2/1984 | Japan . |
| 63-91682 | 4/1988 | Japan . |
| 4-181978 | 6/1992 | Japan . |
| 5-224560 | 9/1993 | Japan . |

*Primary Examiner*—Teresa J. Walberg
*Assistant Examiner*—J. Pelham
*Attorney, Agent, or Firm*—Burns, Doane, Swecker & Mathis, LLP

[57] ABSTRACT

A fixing device including rollers which rotate in mutual contact, a heating source for heating at least one of the rollers, a temperature sensor placed in contact with a roller heated by the heating source to detect the temperature of the roller, and a collar placed in contact with the temperature sensor to cover the area of contact between the temperature sensor and the heated roller. The fixing device has rollers and a temperature sensor having excellent wear resistance and is capable of inexpensive and stable temperature detection.

18 Claims, 4 Drawing Sheets

FIXING DEVICE

BACKGROUND OF INVENTION

1. Field of Invention

The present invention relates to a fixing device for use in various types of image forming apparatuses. These apparatuses form images using electrophotographic methods and thermal fixing methods. Examples of such apparatuses include copying machines and laser printers.

2. Description of the Related Art

Fixing devices having a heating source for heating at least one roller are known. Such devices include a temperature sensor in contact with a roller heated by the heating source which detects the temperature of the roller. A collar in contact with the temperature sensor covers the area of contact between the temperature sensor and the heated roller.

Fixing devices perform a fixing process wherein at least one roller among a pair of rollers in mutual contact is heated by a heating source. This process thermally fuses an electrostatically transferred toner image carried on a sheet which passes between the pair of rollers. The temperature of the heated roller is detected by a temperature sensor. The amount of heat generated by the heating source is controlled in response to the detected temperature. The temperature of the heated roller is maintained within a predetermined range. This temperature range is necessary for a successful fixing process.

Japanese Laid-Open Application No. HEI 2-10427, and Japanese Unexamined Patent Application Nos. SHO 54-88134 and HEI 5-224560 disclose such fixing devices.

The disclosed fixing devices invariably comprise (1) a fixing roller having a flexible layer on an exterior surface and (2) a pressure roller for pressing against the fixing roller. The fixing roller and the pressure roller are provided with an internal heating source. A temperature sensor, such as a thermistor or similar device, is placed in contact with the exterior surface of the end portion of the metal core of the fixing roller. This end portion is not provided with a flexible layer. The temperature sensor is also in contact, at an optional position, with the surface of the pressure roller. The pressure roller is not provided with a flexible layer. The sensor detects the temperature of the rollers which contact the temperature sensor. Temperature regulation is based on this temperature detection.

The temperature sensor, however, makes direct contact with an exposed region of the roller which does not have an elastic layer. This occurs regardless of whether or not the surface of the heated roller is provided with a flexible layer. The contact region between the pair of rollers and the temperature sensor is readily subject to wear and has a short service life.

Japanese Unexamined Patent Application No. SHO 54-88134 further discloses improved wear resistance by providing a temperature sensor embedded in carbon black. In this construction, however, wear on the roller side is not prevented. In addition, because special installation is required to prevent wear of the temperature sensor, the cost of this component is higher.

Consideration has been given to retracting the temperature sensor from the roller, when the heating source of the fixing roller with a flexible layer is turned OFF, during warmup and standby. However, such a construction is complex, results in higher cost, and is unsuitable for a heating roller without a flexible layer.

Consideration has also been given to treating the surface of the roller which contacts the temperature sensor. This surface could be treated with a fluororesin coating process. This process bakes the fluororesin after the elastic layer is vulcanized on the roller. However, the elastic layer cannot withstand the baking temperature of 300° to 400° C. As a result, the elastic layer undergoes a severe change in properties. Even when a fluororesin tube or tape is adhered to the elastic layer, the adhesive has poor heat resistance. The adhesive rises from the roller surface and causes unstable temperature detection.

SUMMARY OF THE INVENTION

A main objective of the present invention is to eliminate the previously described disadvantages by providing a fixing device having excellent roller and temperature sensor wear resistance. In addition, it is capable of inexpensive and stable temperature detection.

The main objective of the present invention is achieved by providing a fixing device comprising (1) rollers which rotate in mutual contact, (2) a heating source for heating at least one of the rollers, (3) a temperature sensor, which contacts a roller heated by the heating source, to detect the temperature of the roller, and (4) a collar, which contacts the temperature sensor, to cover the area of contact between the temperature sensor and the heated roller.

There are two locations where a collar may be placed on a roller which has a flexible layer on the exterior surface of a metal core. The collar may be placed at the exposed end of the metal core or on top of the flexible layer. In either case, it is suitable for the exterior surface of the collar to be formed of heat-resistant material resistant to separation from the collar.

According to a preferred embodiment of the present invention, a collar is provided at the region of contact between the heated roller and the temperature sensor. The collar is placed in contact with the temperature sensor so as to receive the heat from the roller and transmit the heat to the temperature sensor. The collar is positioned so that the temperature sensor stably detects the temperature of the roller in a constant heat transfer. This allows accurate control of the temperature of the roller based on the detected temperature.

The collar used in the present invention may reduce wear caused by contact of the temperature sensor and the collar itself, by use of the surface material of the collar. This improves the service life of both components. In addition, the collar individually assures inexpensive stable temperature detection without the problem of adhesive separating from the roller surface. Adhesive separating from the roller surface is caused by post-processing of a surface layer with a simple construction. This occurs even when the layer is flexible.

Furthermore, in a roller having a metal core with a flexible exterior layer, the collar may be placed at an exposed end of the metal core or on top of the flexible layer.

When the exterior surface of the collar is formed of heat-resistant material resistant to separation from the collar in each of the instances described above, the effectiveness of the present invention can be realized by an individual surface process of the collar.

DETAILED DESCRIPTION OF PREFERRED EMBODIMENTS

Figure 1:
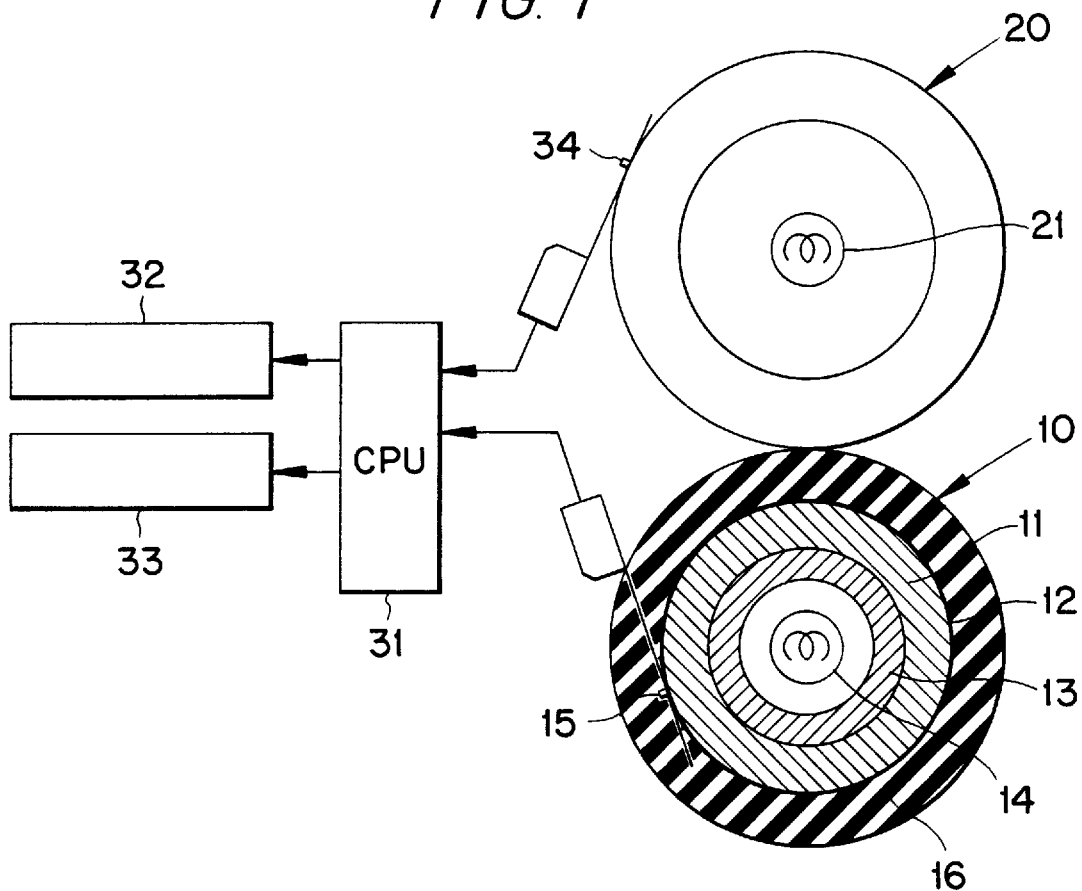
FIG. 1 is an end view showing a fixing device of a first embodiment of the invention.
Figure 2:
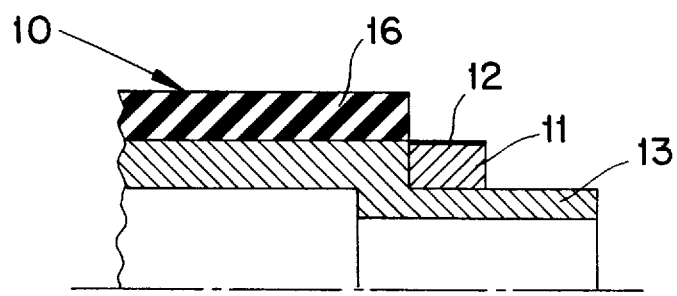
FIG. 2 is a longitudinal section view of the fixing device of FIG. 1.

FIGS. 1 and 2 show a first embodiment of the invention. This embodiment is a thermal fixing device for use in an electrophotographic copying apparatus. This device is provided with a pair of rollers 10 and 20 which rotate in mutual contact, as shown in FIG. 1.

A heating source may be provided to heat at least one or another of the rollers. The heat thermally fixes a toner image carried on a recording after electrostatic transfer as the sheet passes between the rollers. However, in the present embodiment, these rollers 10 and 20 are both provided with an internal heater 14 and 21, respectively. A halogen lamp or other suitable device may be used as a heating source.

Roller 10 comprises a metal core 13 formed of a good heat conductor, e.g., aluminum. The surface of the core has a rubber elastic layer 16. Roller 20 comprises an identical aluminum core as a heat conductor but the surface has a fluororesin coating rather than an elastic layer. Both rollers 10 and 20 press against one another to achieve thermal fixing. The force of this pressure is, for example, about 3 kg/cm$^2$.

As shown in FIGS. 1 and 2, roller 10 is maintained in a predetermined temperature range by providing a temperature sensor (e.g., a thermistor 15 or a similar device). The sensor contacts an exposed surface of an end of the metal core 13 which does not have the rubber layer 16. The current applied to the heater 14 of the roller 10 is controlled based on the temperature information of the roller 10 from the thermistor 15.

This control is accomplished through temperature data from the thermistor 15 which is input to a microcomputer 31. The microcomputer provides a dedicated control means or a control means capable of operation control. It is installed in the electrophotographic copying apparatus and controls the drive circuit 32 of the heater 14 based on the input temperature data.

Furthermore, the temperature of the roller 20 is detected by the thermistor 34 which contacts the surface of the roller 20. Temperature data from the thermistor 34 is input to the microcomputer 31 to control the drive circuit of the heater 21.

The region of the roller 10 in contact with the thermistor 15 is provided with a heat conductor, i.e., a collar 11. This collar is formed of the same type of material as the metal core 13, namely, aluminum. The surface of the collar 11 is provided with a heat-resistant layer 12 resistant to separation from the collar. This eliminates the problem of short service life of the roller 10 resulting from early wearing of the roller caused by contact with the thermistor 15.

The collar 11 is affixed to the metal core 13 by press fitting. The collar 11 may also be attached by shrink fitting and screwing. The collar 11 may even be attached with an adhesive to prevent changes of property and layer rising. Accordingly, a suitable collar 11 will have a thickness beyond rigidity. Surface processing is unnecessary when the collar 11 is provided with a material resistant to separation from the collar.

The collar 11 is provided at the region of the roller 10 in contact with the thermistor 15. The collar receives heat from the roller 10 and conducts the heat to the thermistor 15. This allows the thermistor 15 to stably detect the temperature of the roller 10 through a constant heat transfer path. Accurate control of the temperature of the roller 10 is based on the detected temperature.

The collar 11 reduces the wear caused by the contact of the thermistor 15 and the collar itself at least by means of the surface material of the collar. This improves the service life of both components. The collar 11 individually assures inexpensive stable temperature detection without the problem of a rising surface layer. A adhesive separating from the roller surface. Adhesive separating from the roller surface is caused by post-processing of a surface layer with a simple construction. This occurs even when the surface of the roller has a flexible rubber layer 16.

The release layer 12 in one embodiment is formed of fluororesin. The fluororesin is heated and baked to 300° to 400° C. to achieve a thickness of about 30 to 35 μm.

Since the surface temperature of the rubber layer 16 of the roller 10 is maintained within a range of 140° to 160° C., temperature control which achieves a detected temperature from the collar 11 of 170° C. is suitable.

The surface of the roller 20, which is not provided with a flexible layer, is provided with a fluororesin coating. This coating makes direct contact with a temperature sensor which regulates the roller temperature without a problem. It is to be noted, however, that a collar 11 may be installed on the roller 20 without such surface processing.

Figure 3:
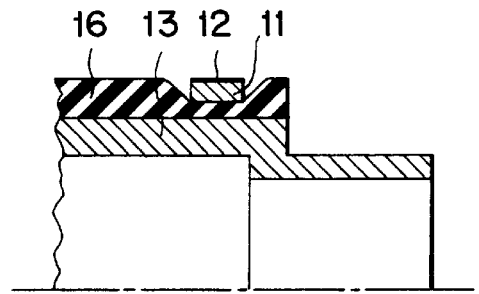
FIG. 3 is a section view of a roller provided with a rubber layer in a second embodiment of the invention.
Figure 4:
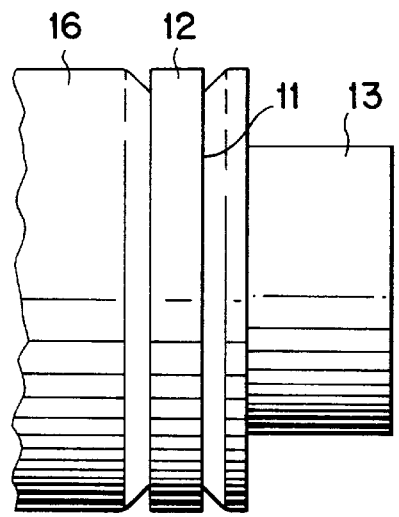
FIG. 4 is a side view of the roller of FIG. 3.

FIGS. 3 and 4 show a second embodiment of the present invention. A roller 10 is comprised of a rubber layer 16 on the surface of a metal core 13. A collar 11 is placed on an exterior surface of an end of the roller 10 which does not have a rubber layer 16. This allows the collar to make direct contact with a temperature sensor. The collar 11 may have an external diameter slightly smaller than the surface diameter of the rubber layer 16 when installed.

In this instance, the heat of the rubber layer 16 is easily reflected because the collar 11 receives the heat from the metal core 13 through the rubber layer 16. The required temperature of the rubber layer 16 must be maintained at a lower detection temperature than in the first embodiment. In other respects, the effectiveness of the second embodiment is not different from the first embodiment.

Figure 5:
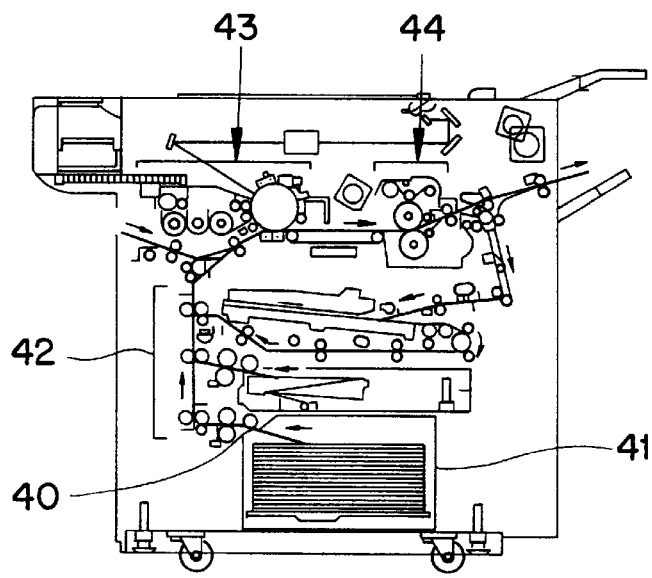
FIG. 5 is a cross-sectional view of a copier illustrating the fixing device.

FIG. 5 shows the image fixing device in a copier. Paper 40 from a stacker 41 is fed to an image forming unit 43 by means of a paper feeding unit 42. After forming an image on the paper, the paper is fed to the fixing device 44.

Figure 6:
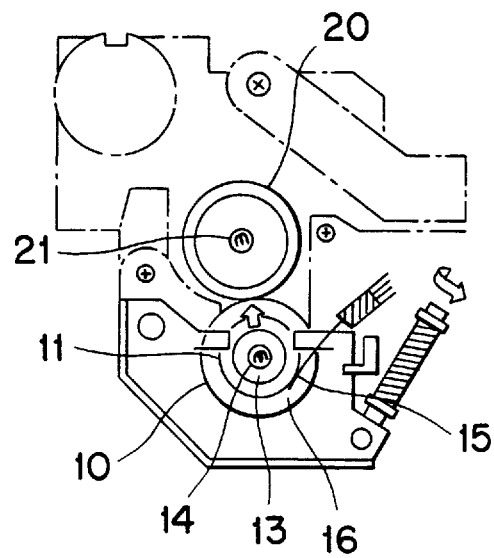
FIG. 6 is an end view of a fixing device.

FIG. 6 shows an end view of a fixing device. The numbers that appear in FIG. 6 correspond to the numbers in FIG. 1.

Figure 7:
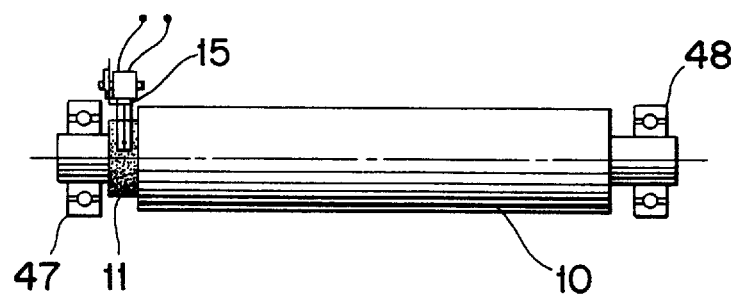
FIG. 7 is a top view of a fixing roller.

FIG. 7 shows a top view of a fixing roller. The numbers that appear in FIG. 7 correspond to the numbers in FIG. 1. Also shown are bearings 47 and 48 which allow the roller to roll while being securely attached to the fixing device.

Figure 8:
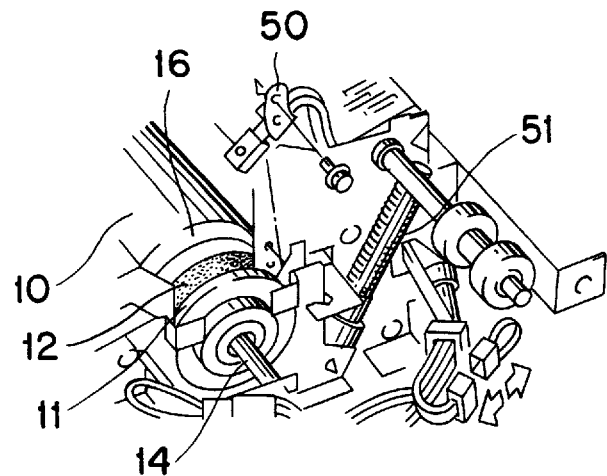
FIG. 8 is a perspective view of a fixing roller.

FIG. 8 shows a perspective view of a fixing roller. The numbers that appear in FIG. 8 correspond to the numbers in FIG. 1. Also shown is a holder 50 for the thermistor and a spring 51 which keeps the thermistor in contact with the roller.

Figure 9:
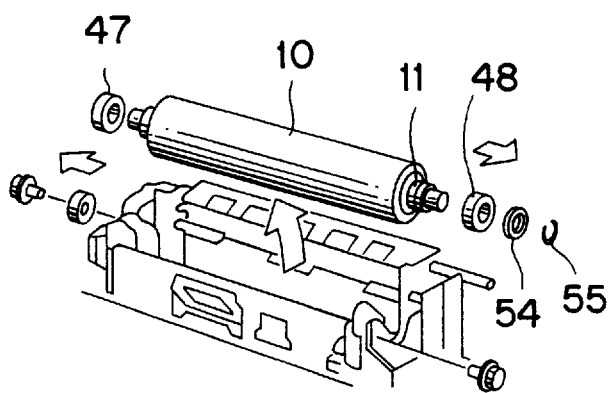
FIG. 9 is another perspective view of a fixing roller.

FIG. 9 shows another perspective view of a fixing roller. The numbers that appear in FIG. 9 correspond to the numbers in FIG. 1. As shown in FIG. 9, the roller may be detachable from the fixing device allowing for repairs and replacement when necessary. Also shown are bearings 47 and 48, washer 54 and C-shaped ring 55.

According to the fixing device of the present invention, a collar provided at a region of contact between a heated roller and a temperature sensor receives heat from the roller. The collar transmits the heat to the temperature sensor which contacts the collar. The temperature sensor stably detects the roller temperature by a constant heat transfer path. This allows accurate control of the roller temperature based on the detected temperature.

In particular, the collar reduces the wear caused by the contact of the temperature sensor with the collar itself at least by means of the surface material of the collar. This improves the service life of both components. The collar individually assures inexpensive stable temperature detection without the problem of adhesive separating from the roller surface. Adhesive separating from the roller surface is caused by post-processing of a surface layer with a simple construction. This occurs even when the surface of the roller is provided with a flexible layer.

Furthermore, in a roller comprising a metal core and a flexible layer on the exterior surface of the metal core, a collar may be placed at an exposed end of the metal core or may be placed on top of the flexible layer.

When the exterior surface of the collar is formed of heat-resistant material resistant to separation from the collar characteristics, in each of the instances described above, the effectiveness of the present invention can be realized by an individual surface process of the collar.

What is claimed is:

1. A fixing device comprising:
    a first and second roller in contact with each other;
    a heater for heating at least said first roller;
    a sensor disposed in contact with said first roller heated by the heater for detecting the temperature of the roller; and
    a cover member in contact with the sensor and the first roller, wherein the cover member is provided at an end of the first roller without contacting said second roller.

2. A fixing device comprising:
    a pair of rollers;
    a heater for heating at least one of said rollers;
    a sensor disposed in contact with a roller heated by the heater for detecting the temperature of the roller; and
    a cover member covering the area of contact between the sensor and the heated roller, wherein the roller comprises a metal core and an elastic layer, and the cover member is located at an end of the roller and does not extend beyond the midpoint of the roller.

3. The fixing device of claim 2, wherein said cover member is formed of the same material as the core.

4. The fixing device of claim 1, wherein the roller comprises a metal core and an elastic layer, and the cover member is provided over the elastic layer.

5. The fixing device of claim 1, wherein the cover member has a heat-resistance layer resistant to separation from the collar.

6. The fixing device of claim 5, wherein the heat-resistance layer comprises a fluoro-resin or a silicone-resin.

7. The fixing device of claim 1, wherein at least one of said rollers is detachable from said fixing device for repairs or replacement.

8. A fixing roller, said roller comprising;
    a roller comprising a core cylinder and an elastic layer covering the core cylinder; and
    a cover member covering the core cylinder covering an area which is to be in contact with the sensor, wherein the cover member is provided at an end of the roller and does not extend beyond the midpoint of the roller.

9. The fixing roller of claim 8, wherein the roller comprises a core cylinder and an elastic layer covering the core cylinder, and the cover member covers the core cylinder.

10. A fixing roller, said roller comprising:
    a roller comprising a core cylinder and an elastic layer covering the core cylinder; and
    a cover member covering the core cylinder, wherein the cover member is formed of the same type material as the core cylinder, is located at an end of the roller and does not extend beyond the midpoint of the roller.

11. The fixing roller of claim 9, wherein the cover member has a heat-resistant layer resistant to separation from the collar.

12. The fixing roller of claim 9, wherein the heat-resistant layer comprises a fluoro-resin or a silicone-resin.

13. The fixing roller of claim 8, wherein the roller comprises a core cylinder and an elastic layer covering the core cylinder, and the cover member covers the elastic layer.

14. The fixing roller of claim 8, wherein the roller includes a mounting system that allows the roller to be detachably mounted on said fixing device.

15. An image forming apparatus comprising:
    an image former for forming a toner image on a recording medium; and a fixing device comprising a first and second roller, heater for heating at least one of said roller, sensor in contact with a roller heated by the heater for detecting the temperature of the roller and a cover member in contact with the sensor and the heated roller, wherein the cover member is provided at an end of the heated roller and does not contact said second roller.

16. The image forming apparatus of claim 15, wherein at least one of said rollers is detachable from said fixing device for repairs or replacement.

17. A method for forming an image comprising forming a toner image on a recording medium, and fixing said toner image on said recording medium with the fixing device of claim 1.

18. A fixing roller, for use in a fixing device which has a sensor sensing temperature, said roller comprising:
    a roller; and
    a metallic cover member, located at an end of the roller without extending beyond the midpoint of the roller, covering an area which is to be in contact with the sensor.

* * * * *